(12) United States Patent
Lee et al.

(10) Patent No.: US 8,173,934 B2
(45) Date of Patent: May 8, 2012

(54) DRY CLEANING APPARATUS AND METHOD

(75) Inventors: Jong Myoung Lee, Gyeonggi-do (KR); Saeng-Ki Lim, Gyeonggi-do (KR); Sung-Ho Cho, Gyeonggi-do (KR)

(73) Assignee: IMT Co. Ltd, Gyeonggi-Do (KR)

( * ) Notice: Subject to any disclaimer, the term of this patent is extended or adjusted under 35 U.S.C. 154(b) by 960 days.

(21) Appl. No.: 12/168,037

(22) Filed: Jul. 3, 2008

(65) Prior Publication Data
US 2009/0008372 A1 Jan. 8, 2009

(51) Int. Cl.
*B23K 26/00* (2006.01)
*B23K 26/36* (2006.01)
*B08B 7/00* (2006.01)

(52) U.S. Cl. ............. 219/121.76; 134/1.3; 438/906; 219/121.61; 219/121.86

(58) Field of Classification Search ........... 219/121.63–121.72, 121.76, 121.61, 219/121.8; 134/1–1.3; 438/906
See application file for complete search history.

(56) References Cited

U.S. PATENT DOCUMENTS

| | | | |
|---|---|---|---|
| 3,382,343 A * | 5/1968 | Muncheryan | 219/121.63 |
| 3,689,156 A * | 9/1972 | Kerpchar | 356/5.04 |
| 4,870,244 A * | 9/1989 | Copley et al. | 219/121.7 |
| 5,669,979 A * | 9/1997 | Elliott et al. | 134/1 |
| 6,433,303 B1 * | 8/2002 | Liu et al. | 219/121.7 |
| 6,610,455 B1 * | 8/2003 | Burberry et al. | 430/200 |
| 6,635,844 B2 * | 10/2003 | Yu | 219/121.68 |
| 6,635,845 B2 * | 10/2003 | Lee et al. | 219/121.68 |
| 6,734,388 B2 * | 5/2004 | Lee et al. | 219/121.68 |
| 6,761,713 B2 * | 7/2004 | Teichmann | 606/10 |
| 6,818,857 B1 * | 11/2004 | Cho et al. | 219/121.64 |
| 7,431,807 B2 * | 10/2008 | Yamamoto | 204/192.1 |
| 2002/0170892 A1 | 11/2002 | Lee et al. | |
| 2005/0029240 A1 * | 2/2005 | Dugan et al. | 219/121.82 |

FOREIGN PATENT DOCUMENTS

JP 359094039 A * 5/1984
KR 463212 12/2004

* cited by examiner

*Primary Examiner* — Samuel M Heinrich
(74) *Attorney, Agent, or Firm* — Woodcock Washburn LLP

(57) ABSTRACT

Disclosed is a dry cleaning apparatus and method for removing contaminants on a surface of a workpiece. The disclosed dry cleaning apparatus comprises a laser cleaning unit having a laser beam generator for generating a laser induced shock wave in the atmosphere, the laser cleaning unit being suitable for removing an inorganic contaminant on the surface of the workpiece using the generated laser induced shock wave; and a flash cleaning unit having a flash generator for generating a flash having pulse wave, the flash cleaning unit being suitable for removing an organic contaminant on the surface of the workpiece using the generated flash.

19 Claims, 3 Drawing Sheets

DRY CLEANING APPARATUS AND METHOD

TECHNICAL FIELD

The present invention relates generally to a dry cleaning apparatus and method, and more particularly, to a dry cleaning apparatus and method having a configuration suitable for simultaneously removing organic and inorganic contaminants existing on a surface of a semiconductor wafer or mask.

BACKGROUND

In a prior art, a wet cleaning method using a chemical solvent has been mainly employed to clean a surface of a semiconductor wafer or mask. In the conventional wet cleaning method, sulfuric acid ($H_2SO_4$), hydrochloric acid (HCl), ammonia ($NH_4OH$), peroxide ($H_2O_2$), hydrogen fluoride (HF) and the like, as the solvent, is used to be mixed with water. In addition to the solvent, a technology using an ultrasonic or megasonic wave in a wet cleaning process has been known.

However, the above wet cleaning method has been faced with problems of environmental pollution caused by use of a large quantity of chemical, a slow operating speed, a requirement for a massive cleaning apparatus, complicated and inferior working conditions and the like. Accordingly, study on a dry cleaning method substituting for the above wet cleaning method having the above problems has been conducted actively in the art.

As such a dry cleaning method, a technology for removing contaminants on a surface of a workpiece, in particular a semiconductor or mask, with laser has been known. However, the dry cleaning technology using a conventional laser has a problem in that it is difficult to simultaneously remove organic and inorganic contaminants on the surface of the workpiece.

In order to solve the above problem, the present inventors have developed a dry cleaning technology for removing organic and inorganic contaminants on a surface of a workpiece with two kinds of laser beams. Such technologies are disclosed in Korean Patent No. 463212 and U.S. Patent Publication No. 2002/0170892, entitled Dry Surface Cleaning Apparatus Using a Laser, filed Mar. 12, 2002. In the above disclosed documents, two kinds of laser beams are used, wherein one of them generates a laser induced shock wave using a focusing lens in the atmosphere, and the other has a characteristic of a short wavelength and is directly radiated to a workpiece to clean it.

At this time, the laser induced shock wave obtained by the one laser beam effectively removes particle-shaped inorganic contaminants existing on a surface of a workpiece, while the direct irradiation of the other laser beam with a short wavelength effectively removes particle-shaped organic contaminants existing on a surface of a workpiece. Consequently, the prior art has an advantage in that all inorganic and organic contaminants, which may exist on a workpiece to be cleaned, can be cleaned by the two kinds of laser beams with different purposes.

However, the prior art has a drawback in that two kinds of laser beams with different purposes should be used to remove inorganic and organic contaminants existing on a surface of a workpiece and a high energy pulse laser should be used for the above two kinds of laser beams which causes an economical loss. Further, in the prior art, a method for generating two kinds of laser beams with different purposes in one laser is suggested. However, since the two kinds of laser beams with different purposes cannot be generated simultaneously, the laser beams are inevitably used in order, and thus, the time required for cleaning process is largely extended.

SUMMARY

The present invention is conceived to solve the aforementioned problems in the prior art. An object of the present invention is to provide a dry cleaning apparatus and method which can simultaneously remove organic and inorganic contaminants existing on a surface of a workpiece, in particular a semiconductor wafer or mask, with a low expense.

According to one aspect of the present invention, there is provided a dry cleaning apparatus for removing contaminants on a surface of a workpiece. The dry cleaning apparatus comprises a laser cleaning unit having a laser beam generator for generating a laser induced shock wave in the atmosphere, the laser cleaning unit being suitable for removing an inorganic contaminant on the surface of the workpiece using the generated laser induced shock wave; and a flash cleaning unit having a flash generator for generating a flash having a pulse wave, the flash cleaning unit being suitable for removing an organic contaminant on the surface of the workpiece using the generated flash.

According to one embodiment of the present invention, the dry cleaning apparatus may further comprise a scanning unit having a working table for supporting the workpiece, wherein the scanning unit is configured so that the working table is moved for scanning the entire surface of the workpiece. The scanning unit may comprise a stage driving part for vertically moving and rotating the working table. Alternatively, the scanning unit may comprise a stage driving part for vertically, longitudinally and laterally moving the working table. According to one embodiment of the present invention, the dry cleaning apparatus may further comprise a dust removing unit for removing contaminants separated from the surface of the workpiece. According to one embodiment of the present invention, the dry cleaning apparatus may further comprise a cooling unit configured to supply cooling fluid to the laser beam generator of the laser cleaning unit or the flash generator of the flash cleaning unit.

According to one embodiment of the present invention, the laser cleaning unit may comprise a laser power supply connected to the laser beam generator to supply instantaneous high voltage power to the laser beam generator, and a focusing lens for focusing the laser beam, which is generated from the laser beam generator by supplying high voltage power of the laser power supply, in the atmosphere. According to one embodiment of the present invention, the flash cleaning unit may further comprise a flash power supply connected to the flash generator to supply high voltage power to the flash generator.

According to a preferred embodiment of the present invention, the dry cleaning apparatus may further comprise an integrated control unit for coordinating and controlling at least the laser cleaning unit, the flash cleaning unit and the scanning unit. The integrated control unit may coordinate and control the dust removing unit as well as the cooling unit in addition to the laser cleaning unit, the flash cleaning unit and the scanning unit as well as the dust removing unit.

According to one embodiment of the present invention, the flash generator may comprise a flash lamp, and a chamber configured to hermetically surround the flash lamp and allow the workpiece to be irradiated with the flash having pulse wave. The chamber may be defined by a support and a transparent window, wherein the support is a hollow member having an open portion facing the workpiece to hermetically receive the flash lamp therein, and the transparent window is hermetically installed to the open portion of the support facing the workpiece. The flash generator may be provided with a light-reflecting plate for directing the flash having pulse wave generated in the flash lamp toward the workpiece. The flash generator may have a pin hole formed therein, and the pin hole may be connected to an optical monitoring device.

According to one embodiment of the present invention, the dust removing unit may be installed above a moving path of the working table to suck and remove the contaminants separated from the surface of the workpiece.

According to a preferred embodiment of the present invention, the laser beam generator may generate an Nd:YAG laser beam with a fundamental wavelength of 1064 nm. The workpiece may be a semiconductor wafer or mask.

According to another aspect of the present invention, there is provided a dry cleaning method for removing contaminants on a surface of a workpiece. The dry cleaning method comprises the steps of generating a laser induced shock wave in the atmosphere and removing an inorganic contaminant on the surface of the workpiece using the generated laser induced shock wave; and generating a flash having pulse wave at the same time of removing the inorganic contaminant and removing an organic contaminant on the surface of the workpiece using the generated flash.

The above and other objects and advantages of the present invention will become apparent from the following description of preferred embodiments.

DETAILED DESCRIPTION OF ILLUSTRATIVE EMBODIMENTS

Hereinafter, the preferred embodiments of the present invention will be described in detail with reference to the accompanying drawings.

Figure 1:
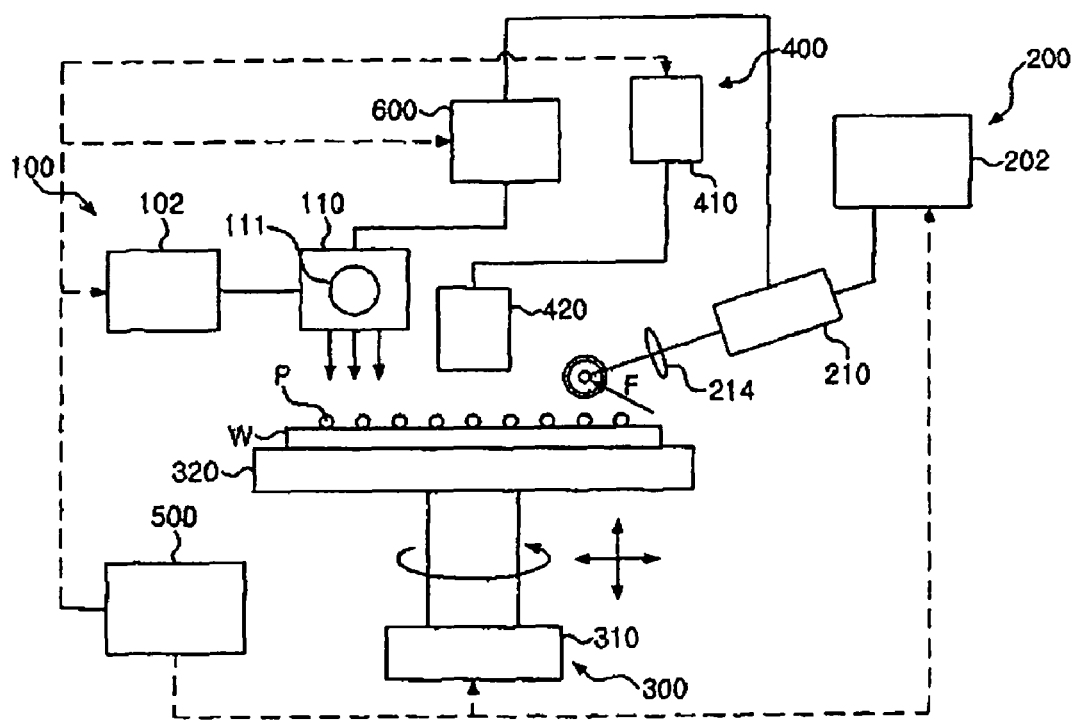
FIG. 1 is a view illustrating a dry cleaning apparatus provided with a laser cleaning unit and a flash cleaning unit according to one embodiment of the present invention.

FIG. 1 illustrates a dry cleaning apparatus according to one embodiment of the present invention. As shown in the figure, the dry cleaning apparatus according to this embodiment comprises a flash cleaning unit 100 for cleaning organic contaminants, a laser cleaning unit 200 for cleaning inorganic contaminants, a scanning unit 300 for supporting an workpiece W to be cleaned and scanning an entire surface thereof, and an integrated control unit 500 for coordinating and controlling the above units 100, 200 and 300.

Furthermore, the dry cleaning apparatus may comprise a dust removing unit 400 for removing organic or inorganic contaminants, which are separated from the surface of the workpiece W by the cleaning units 100 and 200, and a cooling unit 600 for radiating heat by supplying cooling fluid to or circulating cooling fluid in a portion of the flash 30 cleaning unit 100 or the laser cleaning unit 200, at which high temperature heat is generated. At this time, the dust removing unit 400 as well as the cooling unit 600 may also be coordinated and controlled by the integrated control unit 500.

The flash cleaning unit 100 comprises a flash generator 110 to which a flash lamp 111 is mounted. The flash lamp 111 receives high voltage power from a flash power supply 102 to generate intensive flash light. The flash generator 110 is used to separate and remove contaminants P from the surface of the workpiece by irradiating the surface of the workpiece, in particular a semiconductor wafer or mask, with the generated flash. In particular, the flash generated the flash lamp 111 contains a large amount of light in an ultraviolet wavelength region to thereby be suitable for removing organic contaminants. At this time, in view of organic contaminant removal efficiency, it is preferable that a xenon lamp be used as the flash lamp 111.

The flash power supply 102 serves to supply instantaneous hi& voltage to the flash lamp 111. If the flash power supply instantaneously supplies the flash lamp 111 with power of a high voltage of 500 V or more, the flash lamp 111 generates an instantaneous flash and irradiates the workpiece W with the flash. Further, in order to generate instantaneous high voltage, the flash power supply 102 has a simmer board housed therein. The intensity of the flash is in proportion to a magnitude of the power applied to the flash lamp 111.

The laser cleaning unit 200 comprises a laser beam generator 210 for generating a 20 laser beam with extremely high peak power. The laser beam with extremely high peak power is generated in the laser beam generator 210 by supplying the high voltage power thereto from a laser power supply 202 and generates a laser induced shock wave in the atmosphere. More specifically, the above laser beam is an Nd:YAG laser beam with a fundamental wavelength of 1064 nm and explodes nitrogen and oxygen in the atmosphere to generate a shock wave. To this end, the laser beam should have extremely narrow pulse width and extremely large pulse energy. At this time, it is preferable that the laser beam have a pulse width of 100 nanoseconds or less and a pulse energy of 500 mJ or more.

Further, the laser cleaning unit 200 comprises a focusing lens 214, which serves to focus the aforementioned laser beam, preferably the laser beam having a pulse width of 100 nanoseconds or less and a pulse energy 500 mJ or more, in the atmosphere. Due to the assistance of the focusing lens 224, the laser beam is exploded at a focus position of the focusing lens 214 to thereby generate a powerful shock wave. At this time, if the strength of the generated shock wave, i.e., power of the laser induced shock wave, is larger than an adhesive force of a particle-shaped contaminant P adhering to the surface of the workpiece W, the contaminant is separated from the surface of the workpiece W. The separated contaminant, particularly an inorganic contaminant, can be removed completely by the suction operation of the dust removing unit 400 to be described in detail later.

The aforementioned laser induced shock wave is more effective to remove inorganic contaminants. Since the strength of the shock wave is in inverse proportion to a distance between the workpiece and the focus position at which the shock wave is generated, the distance between the workpiece and the focus position is required to be adjusted appropriately, and such adjustment of distance may be achieved, for example, by the scanning unit 300.

The laser power supply 202 generates instantaneous high voltage for generating a powerful laser beam. The configuration of the laser power supply 202 may be similar to that of the flash power supply 102 for operating the flash lamp 111. The laser power supply 202 instantaneously applies the laser beam generator 210 with a high voltage of approximately 500 V or more. The laser energy is increased in proportion to a magnitude of the applied voltage generated in the laser power supply 202, so that the strength of the shock wave generated in the atmosphere is increased in proportion to a magnitude of the applied voltage. Consequently, cleaning performance against contaminants, particularly inorganic contaminants, is remarkably enhanced according to an increase of the applied voltage.

The scanning unit 300 comprises a working table 320 for supporting the workpiece W, in particular a semiconductor wafer or mask, and a stage driving part 310 for moving the working table 320 in scanning. The scanning unit 300 is configured so that the contaminants P including organic and inorganic contaminants existing on the surface of the workpiece W can be cleaned through the entire surface of the workpiece W. To this end, the working table 320 securely fixes and supports the workpiece W, for example, using a vacuum chuck, and the stage driving part 310 makes the working table 320 move so that the entire surface of the workpiece W can be cleaned.

If the workpiece W is a circular semiconductor wafer, the scanning unit 300 provided with rotational axis and X- and Z-moving axes allows the working table 320 to be rotated about or translated along the axes by the operation of the stage driving part 310. Accordingly, the scanning unit 300 makes it possible to rotate or vertically translate the working table 320. In the meantime, if the workpiece W is a rectangular mask, the scanning unit for enabling the working table 320 to be vertically, longitudinally and laterally moved may be usefully employed.

In particular, the scanning unit 300 utilizes a structure, whose vertical height is adjusted along the Z-axis, to enable the surface of the workpiece to approach the flash of the flash cleaning unit 100 and the shock wave of the laser cleaning unit 200. Accordingly, it is possible to more improve the cleaning efficiency for a surface of a workpiece. Additionally, the working table 320 includes a flat seating surface of a workpiece. In order to prevent the workpiece W from moving on the seating surface, the workpiece W can be fixed by a vacuum chuck or securely held and fixed by means of pins.

As previously briefly described, the contaminants P separated from the surface of the workpiece W is sucked and completely removed by the dust removing unit 400. In this embodiment, the dust removing unit 400 comprises a suction device 410 including a suction pump and moreover a dust storeroom, and a dust suction port 420 communicating with the suction device 410 through a pipe and approaching the surface of the workpiece W. Preferably, the dust suction port 420 is fixedly disposed above a moving path of the working table 320 of the scanning unit 300, i.e., at any location above the scanning path of the scanning unit. As the working table 320 moves, the dust removing unit 400 can suck and remove contaminants on the workpiece W, which is supported on the working table 320, through the dust suction port 420.

In addition, the dry cleaning apparatus according to the present embodiment further comprises the cooling unit 600 for cooling the flash generator 110 and/or the laser beam generator 210 in such a manner that cooling fluid is supplied to or circulated in the flash generator 110 of the flash cleaning unit 100 and/or the laser beam generator 210 of the laser cleaning unit 200. The cooling unit 600 may be formed as a single structure configured to supply cooling fluid to both of the flash generator 110 and the laser beam generator 210. Alternatively, the cooling unit 600 may be divided into two independent parts for separately supplying cooling fluid to the flash generator 110 and the laser beam generator 210. Also, the cooling unit 600, which is operated to cool only one of the flash generator 110 and the laser beam generator 210, falls within the scope of the present invention.

More specifically, the cooling unit 600 cools the heat generated when the flash lamp 111 is turned-on by supplying the high voltage power and the heat generated together with the laser beam in the laser beam generator 210 by supplying the high voltage power. Due to the characteristics of the flash lamp 111 and the laser beam generator 210 which instantaneously generate a powerful energy, a large amount of heat is necessarily generated. In a case where the generated heat is accumulated around the flash lamp 111 or the laser beam generator 210, the accumulated heat causes the deterioration in performance of the flash lamp 111 or the laser beam generator 210, and moreover, the reduction of the expected life span thereof. It is preferable that the cooling unit 600 include a circulating water-cooling radiator. In this case, if water is used as coolant, the problems such as current leakage and pollution are caused. Accordingly, it is preferable to use distilled water or deionized water as coolant. It is most preferable that the temperature of coolant be set within a range of 20 to 30° C.

According to an embodiment of the present invention, the cooling unit 600 can be controlled by the integrated control unit 500 as described above. In this case, the integrated control unit 500 coordinates and controls all of the flash cleaning unit 100, the laser cleaning unit 200, the scanning unit 300 and the cooling unit 600.

The integrated control unit 500 may control the flash cleaning unit and the laser cleaning unit to use all the flash and the laser induced shock wave or only any one of them in a cleaning process according to use or purpose of the cleaning. For example, an industrial computer or a programmable logic controller (PLC) may be used as the integrated control unit 500.

Figure 2:
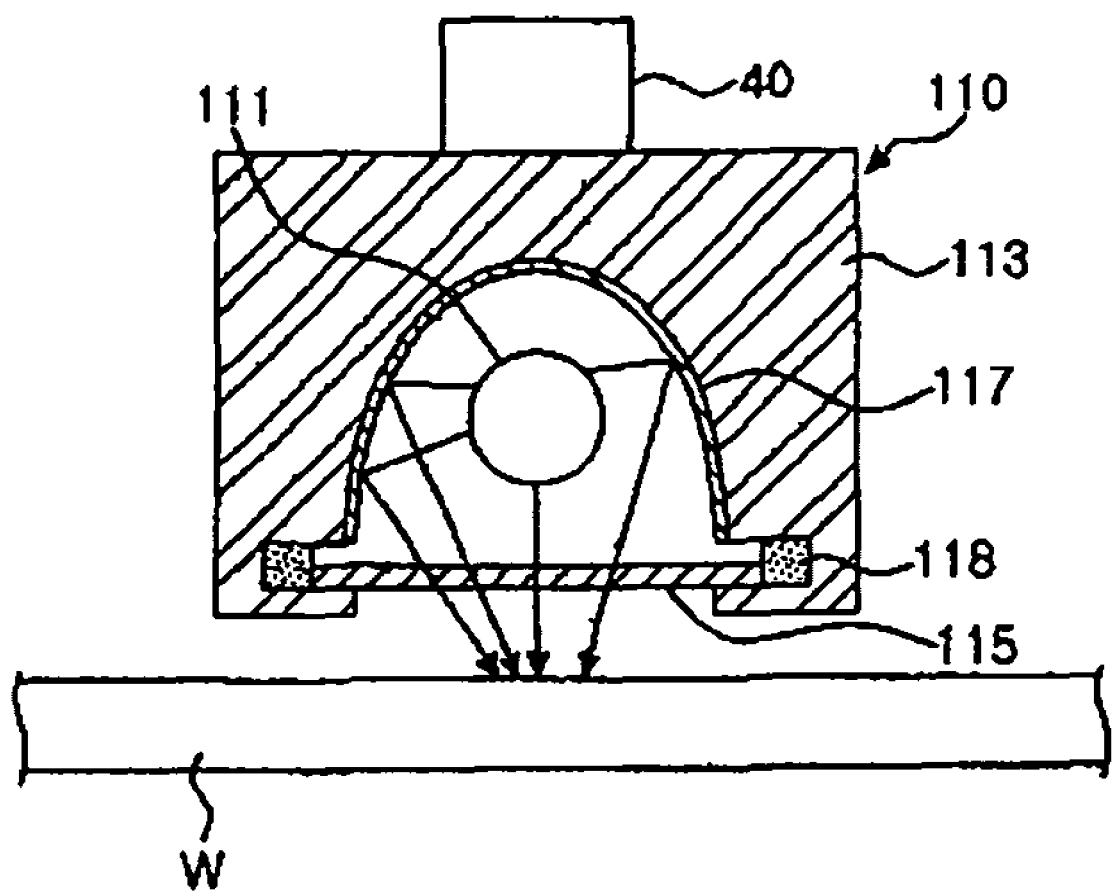
FIG. 2 is a detailed front sectional view of a flash generator of the flash cleaning unit shown in FIG. 1.
Figure 3:
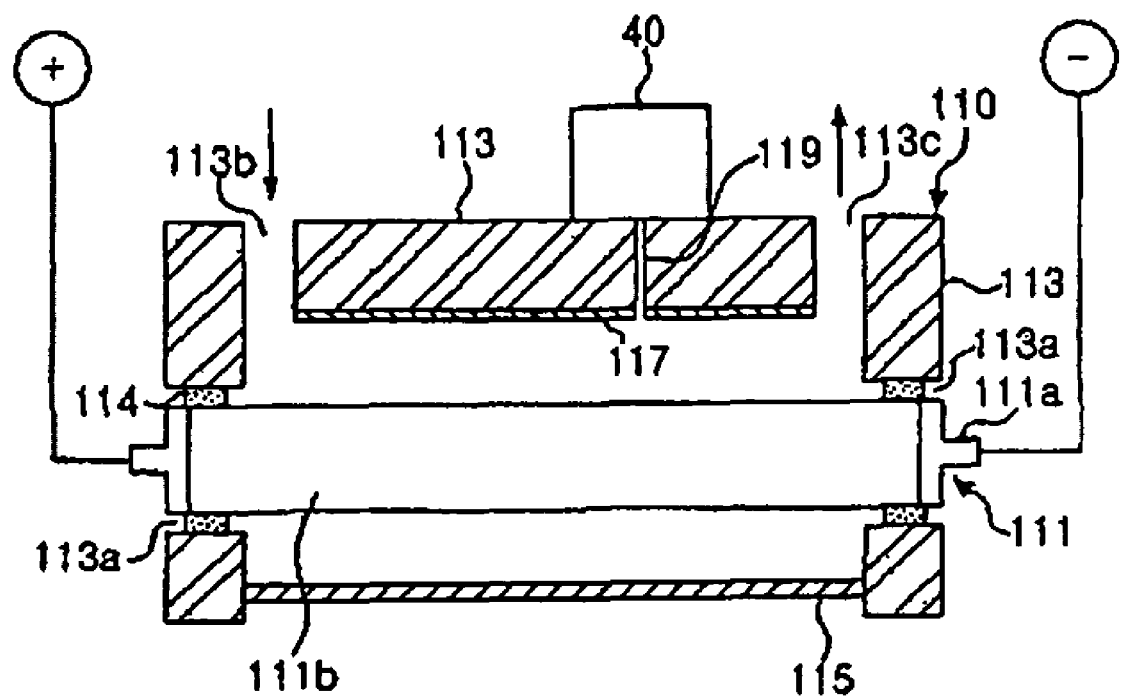
FIG. 3 is a detailed side sectional view of the flash generator of the flash cleaning unit shown in FIGS. 1 and 2.

FIGS. 2 and 3 are views for more specifically illustrating the configuration of the flash generator 110 of the aforementioned flash cleaning unit.

Referring to FIGS. 2 and 3, the flash lamp 111 is supported to a support 113. The support 113 is a hollow member having an open portion facing the workpiece W. The interior of the support has a shape corresponding to the flash lamp 111 and a size larger 5 than that of the flash lamp so that the flash lamp 111 can be received inside of the support to be spaced apart from an inner wall surface of the support. It is exemplarily illustrated in this embodiment that the support 113 has the open lower portion, is formed to extend in the longitudinal direction along the rod-shaped flash lamp 111, and has supporting holes 113a formed at both side ends for receiving and supporting the flash lamp 111. The supporting holes 113a are positioned so that a light emitting part 111b of the flash lamp 111 is not in contact with the inner wall surface the support 113 when electrode parts 111a of the flash lamp 111 are inserted and supported in the supporting holes 113a.

In order to allow coolant to flow around the flash lamp 111, the support 113 and the transparent window 115 should be configured so that they hermetically surround the light emitting part 111b of the flash lamp 111 and allow the workpiece W to be irradiated with the flash having pulse wave. In this embodiment, a gap between the supporting holes 113a of the support 113 and a boundary of the electrode part 111a and the light emitting part 111b of the flash lamp 111 is hermetically sealed with sealant 114, and a transparent window 115 is installed to the portion of the support 113 facing the workpiece W, i.e., the open lower portion of the support 113. A gap between the transparent window 115 and the support 113 is hermetically sealed by sealant 118.

It is preferable that an O-ring, a Teflon tape or epoxy and silicon resin be used as the sealant 118.

The support 113 and the transparent window 115 sealed as described above define a sealed chamber around the flash lamp 111. Coolant is supplied to and circulated in the sealed chamber, wherein an inlet 113b and an outlet 113c are respectively formed at both end of the support 113, and a coolant circulating line of the aforementioned cooling unit 600 (see FIG. 1) is connected to the inlet 113b and the outlet 113c.

The transparent window 115 should allow the workpiece W to be effectively irradiated with the flash generated in the flash lamp 111, so that the transparent window 115 is preferably formed of quartz having an excellent transmittance for light having every wavelength. The transparent window 115 serves to protect the interior of the flash generator 110 from the separated contaminants. It is preferable to use stainless steal based material on which rust does not occur as a material of the support 113.

In the flash generator 110, a light-reflecting plate 117 is provided inside of the flash lamp 111. The light-reflecting plate 117 focuses the flash having pulse wave generated in the flash lamp 111 on the workpiece W. The light-reflecting plate 117 is manufactured in a semi-elliptic cross section and a curvature of the light-reflecting plate may be determined so that light can be effectively transmitted to the workpiece. This embodiment exemplarily shows that an intermediate inner wall of the support 113 of the flash generator 110 has a semi-elliptic cross section and the light-reflecting plate 117 of a semi-elliptic cross section is attached to the inner wall of the support 113.

It is preferable to make the light-reflecting plate of gold, silver or ceramic having an excellent reflectance for light having every wavelength. In the meantime, the light-reflecting plate may be manufactured by coating an interior of the flash generator with a reflective material. A pin hole 119 is formed in the support 113 of the flash generator 110. An optical monitoring device 40 which is an additional component is connected to the pin hole 119. The pin hole 119 is bored through the light reflecting plate 117 and the support 113.

The optical monitoring device 40 is to measure intensity of the light emitted from the flash lamp 111 in real time. The flash lamp 111 has a limited lift span and its light intensity is gradually lowered as time goes by due to characteristics of the lamp. Since the cleaning performance is in proportion to the light intensity, it is very important to measure the light intensity in real time for the stable cleaning process. In order to measure the light intensity as described above, an optical sensor is mounted near the flash generator to measure the light intensity in real time, and a controller checks a light intensity change versus time at any time. If the measured value is less than a reference value of the light intensity at which the cleaning process is smoothly performed, the controller automatically increases a magnitude of voltage supplied from the high voltage power supply or transmits the signal to the operator to automatically alarm an abnormal condition. A photo diode may be used as the optical sensor, and an optical filter capable of selecting the light with a specific wavelength may be installed in front of the optical sensor for the purpose of precise detection.

As shown in the figures, if the optical monitoring device 40 for measuring intensity of the light generated from the flash lamp 111 is attached to the flash generator 110 and senses the light transmitted through the pin hole 119 formed in the flash generator 110, the optical monitoring device directly receives the light generated from the flash lamp 111 and measures the light intensity, so that it is possible to minimize a variation in light intensity caused by an external environment. Consequently, there is an advantage in that precise and reliable optical monitoring can be obtained.

Further, a light-shielding part may be installed above the flash generator 110 to prevent an operator from being exposed to the flash having pulse wave generated in the flash lamp 111. In addition, the light-shielding part can cover the laser beam generator 210 (see FIG. 1) as well as the flash generator 110. If the light-shielding part is used, it is possible to decrease emission of intensive light, in particular a powerful flash, generated in the cleaning process as low as possible. As described above, the installation of the device for shielding flash is very important to secure a comfortable working environment. The light-shielding part may be manufactured in the shape of a case made of an opaque metal material and manufactured by attaching a light-absorbing material thereto.

According to an embodiment of the present invention, it is possible to implement an apparatus capable of removing effectively and simultaneously organic and inorganic contaminants with a smaller expense as compared with the prior art in which contaminants on a surface of a workpiece, in particular a semiconductor wafer or mask, are removed by two laser beams. In addition, as compared with a laser beam with short-wavelength used mainly for removing organic contaminants, there is an advantage in that a cleaning process for a surface of a workpiece can be completely performed within a very short time using the flash lamp. Also, the present invention relates to a dry cleaning method in which any chemical is not used and is an environment-friendly technology which does not generate foul water and wastewater. In addition, consumptive materials and post-treating expense are not required, thereby remarkably saving the manufacturing cost. Also, it is possible to implement a small-sized dry cleaning apparatus, which makes it possible to manufacture a modularized dry cleaning apparatus. In particular, the dry cleaning apparatus and method of the present invention can be easily applied to a conventional production line for conventional semiconductors and displays, so that the present invention has an excellent compatibility and can contribute to increasing the production efficiency remarkably in a process for mass-producing semiconductors and displays.

What is claimed is:

1. A dry cleaning apparatus for removing contaminants on a surface of a workpiece, comprising:
   a laser cleaning unit having a laser beam generator for generating a laser induced shock wave in the atmosphere, the laser cleaning unit being suitable for removing an inorganic contaminant on the surface of the workpiece using the generated laser induced shock wave; and
   a flash cleaning unit having a flash generator for generating a flash light in an ultraviolet wavelength region having a pulse wave, the flash cleaning unit being suitable for removing an organic contaminant on the surface of the workpiece using the generated flash light.

2. The dry cleaning apparatus as claimed in claim 1, further comprising a scanning unit having a working table for supporting the workpiece, wherein the scanning unit is configured so that the working table is moved for scanning the entire surface of the workpiece.

3. The dry cleaning apparatus as claimed in claim 2 wherein the scanning unit comprises a stage driving part for vertically moving and rotating the working table.

4. The dry cleaning apparatus as claimed in claim 2 wherein the scanning unit comprises a stage driving part for vertically, longitudinally and laterally moving the working table.

5. The dry cleaning apparatus as claimed in claim 2, further comprising a dust removing unit for removing contaminants separated from the surface of the workpiece.

6. The dry cleaning apparatus as claimed in claim 1, further comprising a cooling unit configured to supply cooling fluid to the laser beam generator of the laser cleaning unit or the flash generator of the flash cleaning unit.

7. The dry cleaning apparatus as claimed in claim 1 wherein the laser cleaning unit comprises a laser power supply connected to the laser beam generator to supply instantaneous high voltage power to the laser beam generator, and a focusing lens for focusing the laser beam, which is generated from the laser beam generator by supplying high voltage power of the laser power supply, in the atmosphere.

8. The dry cleaning apparatus as claimed in claim 1 wherein the flash cleaning unit further comprises a flash power supply connected to the flash generator to supply high voltage power to the flash generator.

9. The dry cleaning apparatus as claimed in claim 2, further comprising an integrated control unit for coordinating and controlling at least the laser cleaning unit, the flash cleaning unit and the scanning unit.

10. The dry cleaning apparatus as claimed in claim 1 wherein the flash generator comprises a flash lamp, and a chamber configured to hermetically surround the flash lamp and allow the workpiece to be irradiated with the flash light having a pulse wave.

11. The dry cleaning apparatus as claimed in claim 10 wherein the chamber is defined by a support and a transparent window, the support being a hollow member having an open portion facing the workpiece to hermetically receive the flash lamp therein, the transparent window being hermetically installed to the open portion of the support facing the workpiece.

12. The dry cleaning apparatus as claimed in claim 10 wherein the flash generator is provided with a light-reflecting plate for directing the flash light having a pulse wave generated in the flash lamp toward the workpiece.

13. The dry cleaning apparatus as claimed in claim 10 wherein the flash generator has a pin hole formed therein, and the pin hole is connected to an optical monitoring device.

14. The dry cleaning apparatus as claimed in claim 5 wherein the dust removing unit is installed above a moving path of the working table to suck and remove the contaminants separated from the surface of the workpiece.

15. The dry cleaning apparatus as claimed in claim 1 wherein the laser beam generator generates an Nd:YAG laser beam with a fundamental wavelength of 1064 nm.

16. The dry cleaning apparatus as claimed in claim 1 wherein the workpiece is a semiconductor wafer or mask.

17. A dry cleaning method for removing contaminants on a surface of a workpiece, comprising:
generating a laser induced shock wave in the atmosphere and removing an inorganic contaminant on the surface of the workpiece using the generated laser induced shock wave; and
generating a flash light in an ultraviolet wavelength region having a pulse wave at the same time of removing the inorganic contaminant and removing an organic contaminant on the surface of the workpiece using the generated flash light.

18. The dry cleaning method as claimed in claim 17 wherein a cleaning process is performed on the workpiece supported on a working table while the working table is moved for the entire surface thereof to be scanned.

19. The dry cleaning method as claimed in claim 17 wherein the workpiece is a semiconductor wafer or mask.

* * * * *